No. 866,963. PATENTED SEPT. 24, 1907.
C. RAUHE.
DENTAL BUR.
APPLICATION FILED JULY 9, 1907.

Witnesses:
Arthur E. Zumpe
William Schulz

Inventor
Carl Rauhe
By his Attorney

UNITED STATES PATENT OFFICE.

CARL RAUHE, OF DUSSELDORF, GERMANY.

DENTAL BUR.

No. 866,963. Specification of Letters Patent. Patented Sept. 24, 1907.

Application filed July 9, 1907. Serial No. 382,824.

*To all whom it may concern:*

Be it known that I, CARL RAUHE, a citizen of Germany, residing at Dusseldorf, Germany, have invented new and useful Improvements in Dental Burs, of which the following is a specification.

This invention relates to a dental bur which is so constructed that it will more effectively attack and penetrate the enamel of a tooth than the burs heretofore in use.

Figure 1:
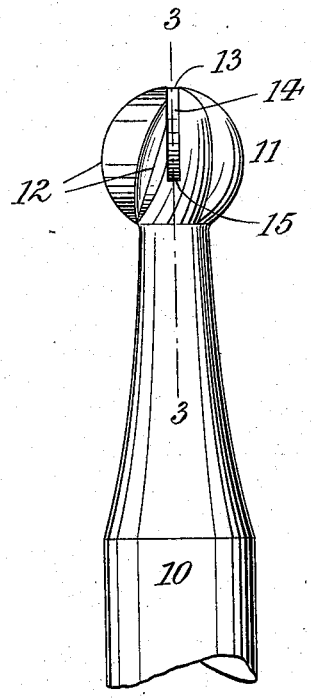
Figure 3:
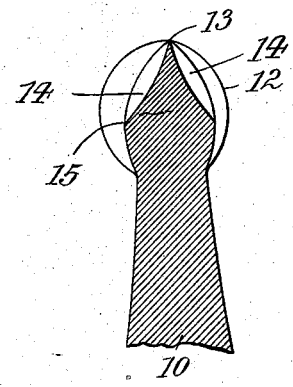
Figure 4:
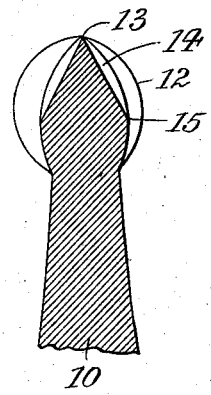
Figure 2:
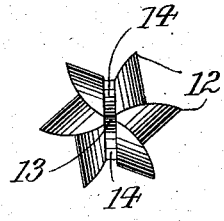

In the accompanying drawing: Figure 1 is an enlarged side view of my improved dental bur; Fig. 2 an end view thereof; Fig. 3 a longitudinal section on line 3—3, Fig. 1, and Fig. 4 a similar section of a modification.

The shank 10 of the bur is provided with a spherical head 11 having inclined or spiral teeth 12 separated by intervening grooves and converging at the apex of the head. In addition to teeth 12 the head is provided at its apex with a cutting edge 13, which is formed by a pair of grooves 14 extending in diametrically opposite directions from such apex and which may be sunk below the surface of head 11. These grooves may have any desired cross section and are made of suitable depth and length, terminating preferably at some distance below the center of the head as at 15.

By the construction described, grooves 14 converge towards the apex of the head, where they form the intervening apical cutting edge 13. The base of each groove 14 may be concave, (Fig. 3), straight, (Fig. 4), or of other suitable shape.

It will be seen that cutting edge 13 attacks the tooth at the apex of the bur, while the side walls of grooves 14 constitute breakers that greatly assist the teeth 12 in penetrating the enamel. Furthermore, grooves 14 facilitate the ready escape of the chips removed by the bur.

I claim:

A dental bur provided with a head having teeth, grooves separating the teeth, and a pair of diametrically opposed additional grooves converging towards the apex of the head to form an apical cutting edge between the teeth, substantially as specified.

Signed by me at New York city, Manhattan, New York, this 25th day of June, 1907.

CARL RAUHE.

Witnesses:
WILLIAM SCHULZ,
FRANK V. BRIESEN.